(12) United States Patent
Bigourdan et al.

(10) Patent No.: US 10,657,465 B2
(45) Date of Patent: May 19, 2020

(54) DOUBLE-BOOKING PREVENTION

(71) Applicant: Amadeus S.A.S., Sophia Antipolis (FR)

(72) Inventors: Tristan Bigourdan, Nice (FR); Guillaume Beaucour, Antibes Juan les Pins (FR); Frederic Geraci, Mouans Sartoux (FR)

(73) Assignee: AMADEUS S.A.S., Biot (FR)

( * ) Notice: Subject to any disclaimer, the term of this patent is extended or adjusted under 35 U.S.C. 154(b) by 645 days.

(21) Appl. No.: 14/223,047

(22) Filed: Mar. 24, 2014

(65) Prior Publication Data

US 2015/0269498 A1 Sep. 24, 2015

(51) Int. Cl.
*G06Q 10/02* (2012.01)
(52) U.S. Cl.
CPC .................. *G06Q 10/02* (2013.01)
(58) Field of Classification Search
CPC ........................................ G06Q 10/02
USPC ............................................. 705/5
See application file for complete search history.

(56) References Cited

U.S. PATENT DOCUMENTS

| | | | |
|---|---|---|---|
| 5,784,562 A | 7/1998 | Diener | |
| 6,237,035 B1* | 5/2001 | Himmel | G06F 16/958 709/224 |
| 6,823,366 B1* | 11/2004 | Nakano | H04L 29/06 709/206 |
| 6,934,761 B1* | 8/2005 | Curtis | G06F 17/30902 707/E17.12 |
| 7,296,076 B1* | 11/2007 | Portolani | H04L 67/1027 709/217 |
| 7,509,642 B1* | 3/2009 | Mitchell | H04Q 3/0087 707/999.2 |
| 2006/0080670 A1* | 4/2006 | Lomet | G06F 11/1474 719/314 |
| 2010/0082823 A1 | 4/2010 | Cui et al. | |
| 2012/0203579 A1* | 8/2012 | Glasson | G06Q 10/02 705/5 |
| 2013/0066948 A1* | 3/2013 | Colrain | H04L 67/146 709/203 |

(Continued)

FOREIGN PATENT DOCUMENTS

WO 03079243 A1 9/2003

OTHER PUBLICATIONS

Chuan, Lim, "CASE Survey on Budget Airlines' Refund Policy for Duplicate / Double Bookings," Aug. 2013, Consumers Association of Singapore, retrieved from https://www.case.org.sg/admin/news/pdf/219_pdf.pdf (Year: 2013).*

(Continued)

*Primary Examiner* — Michael P Harrington
*Assistant Examiner* — Bryan J Kirk
(74) *Attorney, Agent, or Firm* — Thompson Hine LLP

(57) ABSTRACT

Methods, systems, and computer program products for preventing double processing of a repeated or duplicated booking request received from a client in a transaction session over a computer network. A first booking request is received from the client over the computer network and processed. When a second booking request repeating or duplicating the first booking request is received from the client, response data prepared in response to the first booking request is assigned to the repeated booking request. A response to the repeated booking request is returned to the client. The response includes the response data prepared in response to the first booking request.

7 Claims, 7 Drawing Sheets

(56) References Cited

U.S. PATENT DOCUMENTS

2013/0262162 A1* 10/2013 Haney .................... G06Q 10/08
 705/5
2013/0297357 A1* 11/2013 Shih ....................... G06Q 10/02
 705/5

OTHER PUBLICATIONS

PCT, International Search Report and Written Opinion, International Application No. PCT/EP2015/000607; dated Jun. 1, 2015, 10 pages.
European Patent Office, search report issued in application No. 14290075.2 dated Jul. 2, 2014.
European Patent Office, Official Action issued in Application No. 15 717 417.8 dated Aug. 22, 2018.
European Patent Office, Official Action issued in Application No. 15 717 417.8 dated Dec. 9, 2019.

* cited by examiner

DOUBLE-BOOKING PREVENTION

BACKGROUND

The invention relates to generally relates to computers and computer software and, in particular, to methods, systems, and computer program products for preventing double processing of a repeated booking request from a client in a transaction session over a computer network.

Electronic-commerce transactions of various kinds, e.g., in the travel field for finding and booking flights, may use request-response protocols to exchange content, e.g., HTML documents over the Internet, such as the hypertext transfer protocol (HTTP) which, in turn, relies on the TCP/IP protocols, collectively referred to as the "web". In a transaction session formed by one or more related transactions, a server (e.g., a travel-booking server) receives requests (generally referred to as "booking requests") from a client and returns responses to the client.

A user may use a request-response application, also referred to as a browser application, enabling the client computer to send a booking request to the server. The server may receive the same request twice before a response to the first request is returned. For example, if the user gets impatient or experiences a temporary Internet outage, the user may refresh or re-submit the initial request. In those cases, the booking request may unintentionally be processed twice, which is also referred to as double booking. To discourage users from refreshing or resubmitting a request while the initial request is still being processed, the server may return an intermediate webpage displayed at the browser that warns the user to patiently wait for receipt of the response to the initial request.

Improved methods, systems, and computer program products are needed that prevent double processing of a repeated or duplicated booking request from a client in a transaction session.

SUMMARY

In one embodiment, a method is provided for preventing double booking in response to a repeated or duplicated booking request received from a client. A first booking request may be received from the client at a server. The first booking request may be processed with the server. The processing of the first booking request may include initiating preparation of response data for the client. In response to the receipt of a second booking request that is a repetition of the first booking request from the client, the server may prevent the second booking request from being processed. The server may assign the response data to the second booking request or to the booking-result request. After the response data is assigned, the server may return a response comprising the response data to the client.

In another embodiment, a system is provided for preventing double or duplicate booking in response to a repeated or duplicated booking request received from a client. The system includes at least one processor and program code configured to be executed by the at least one processor to cause the at least one processor to receive a first booking request from the client and process the first booking request. Processing the first booking request includes initiating preparation of response data for the client. The program code is further configured to be executed by the at least one processor to cause the at least one processor to prevent the second booking request from being processed in response to receiving a second booking request that is a repetition of the first booking request from the client, assign the response data to the second booking request or to the booking-result request in response to receiving the second booking request or a booking-result request from the client, and return a response comprising the response data to the client after the response data is assigned.

In one embodiment, a method is provided for sending booking requests from a client to a server and handling responses to the booking requests at the client. A first booking request is sent from the client to the server. The client receives mobile program code from the server in response to the first booking request. The mobile program code is processed, which includes displaying status information received from the server and indicative of a status of the processing of the first booking request by the server. In response to receiving an output-ready message from the server, a second booking request is sent that is a repetition of the first booking request or a booking-result request from the client to the server. In response to the second booking request or the booking-result request, the client receives response data prepared by the server in response to the first booking request. The response data is displayed at the client.

In another embodiment, a system is provided for sending booking requests to a server and handling responses to the booking requests. The system includes at least one processor and program code configured to be executed by the at least one processor to cause the at least one processor to send a first booking request to the server, receive mobile program code from the server in response to the first booking request, and process the mobile program code. Processing the mobile program code includes displaying status information received from the server and indicative of a status of the processing of the first booking request by the server. The program code is further configured to be executed by the at least one processor to cause the at least one processor to send a second booking request that is a repetition of the first booking request or a booking-result request to the server in response to receiving an output-ready message from the server, receive response data prepared by the server in response to the first booking request in response to the second booking request or the booking-result request, and display the response data.

Embodiments of the invention are also directed to methods, systems, and computer program products for preventing double booking in response to a repeated or duplicated booking request received from a client. A first booking request is received from the client at a server. The server initiates the preparation of response data for the client to process the first booking request. In response to receipt of a second booking request from the client that is a repetition or duplicate of the first booking request, the server prevents the second booking request from being processed. The server assigns the response data to the second booking request or to the booking-result request. After the response data is assigned, a response comprising the response data is returned from the server to the client.

Embodiments of the invention are also directed to methods, systems, and computer program products for sending booking requests from a client to a server and handling responses to the booking requests at the client. A first booking request is sent from the client to the server, and mobile program code from the server is received at the client in response to the first booking request. The mobile program code is processed at the client such that status information received from the server and indicative of a status of the processing of the first booking request by the server is displayed at the client. In response to receipt of an output-ready message from the server, a second booking request that is a repetition of the first booking request or a booking-result request is sent from the client to the server. In response to receipt of the second booking request or the booking-result request, the client receives response data prepared by the server based upon the first booking request. The response data is displayed at the client

BRIEF DESCRIPTION OF THE SEVERAL VIEWS OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
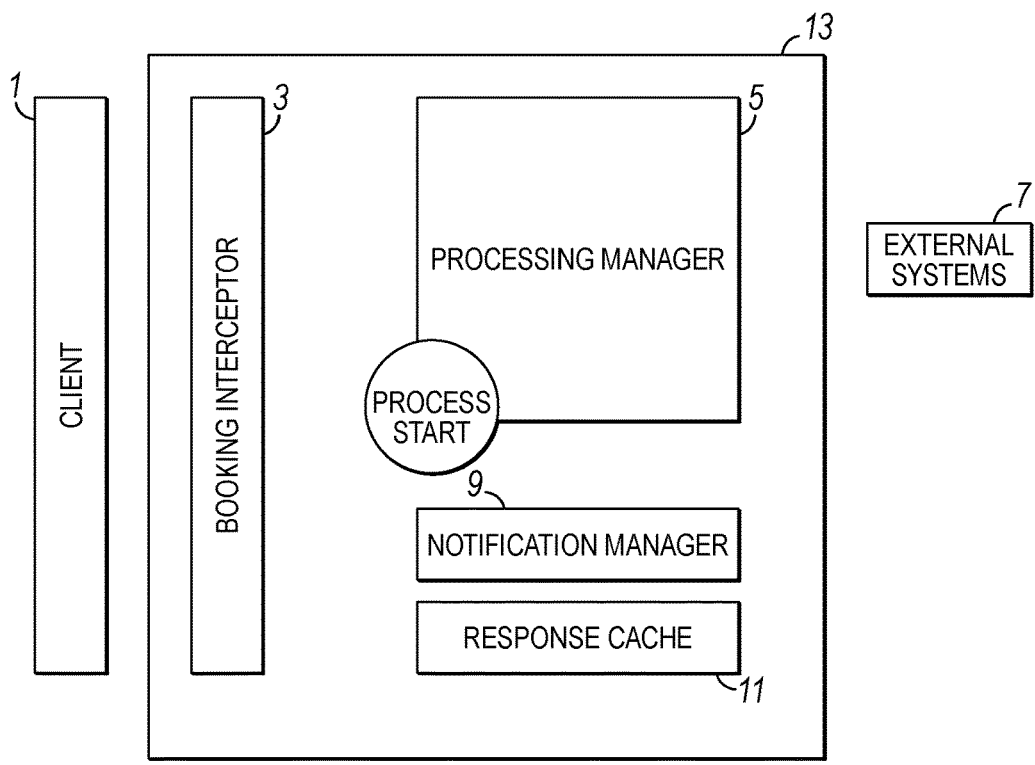
FIG. 1 is a schematic overview of a first exemplary type of a client-computer and server-computer system which is the basis of various embodiments illustrated in FIGS. 2 to 5.

Prevention of Double Processing; Mainly Server Side

This description pertains to the prevention of double processing of a repeated booking request from a client to a server in a transaction session (or briefly "session") in which the client and server use a request-response protocol in a computer network. A client-server transaction can be described from the client's perspective, the server's perspective, and from a higher-level perspective including both the client and the server. "Booking" is used herein as a generic term for commercial transactions over computer networks also covering order, purchase, payment, and banking transactions.

The computer network may be the Internet. The communication between the client and the server may be secured, e.g., by encryption. The protocol used may be, for example, a hypertext transfer protocol, such as HTTP or HTTPS, based on TCP/IP (HTTP and HTTPS are jointly referred to as "HTTP" herein). Content exchanged may be, for example, in the form of a hypertext markup language, such as HTML or XHTML (HTML and XHTML are jointly referred to as "HTML" herein).

Transactions comprise one or more requests and responses which belong together. For example, a booking transaction may comprise several requests including registration, selection of goods or services, order confirmation, payment, etc, which form what is called a session, or transaction session.

Some request-response protocols, such as HTTP, are stateless. This means that the request-response protocol only links a single request to its response, thus establishing request-response pairs, but does not provide any functionality to take the history of requests into account and bind several request-response pairs together. In order that more than one request-response pair can be assigned to a transaction session, a session identifier can be defined for each transaction session, and associated with all the requests and responses belonging to that transaction session. For example, the session identifier can be included in all the requests and responses exchanged between the server and the client belonging to that transaction session.

Two entities, a server and a client, are involved in the booking process. Some activities are conducted at the server side and other activities are conducted at the client-side. "Client" and "server", as used herein, do not refer to persons but rather to client computers and server computers, and to computer processes in the client and server computers using a client-server protocol, such as HTTP.

The client can be a computer executing, for example, a browser configured to take the role of the requestor in the request-response protocol, e.g., a Web browser, i.e., a software application for retrieving, presenting and traversing information resources on the World Wide Web. The browser, e.g., Chrome®, Firefox®, Internet Explorer®, is able to communicate according to HTTP and display HTML documents.

In some embodiments, the browser on the computer is also configured to execute mobile program code received in an HTTP response and embedded or referenced in an HTML document, such as mobile program code written in a script language interpreted by the browser, such as JavaScript®, or machine-independent bytecode interpreted by the client computer, such as a Java® applet. Code to represent Web pages expressed in a mark-up language, such as HTML, is not considered herein to be "mobile program code".

The server may be a web server enabling the server computer system to take the role of the respondent in the request-response protocol, e.g., HTTP, such as an Apache® server. The server may be programmed to dynamically generate HTML documents to be sent to the client, and to carry out the server-side part of the methodologies described herein. The program may be in a server script language, such as Perl® or PHP®. The server may be in communication with external systems, such as other servers and/or databases in the background.

The server-side method comprises receiving a first, or initial, booking request, e.g., a travel-booking request from the client over the computer network (e.g., the Internet). The server-side process processes the first booking request, i.e. by initiating the preparation of booking-response data for the client. In some embodiments, the processing of the booking and the preparation of the booking response may be performed by the server. In other embodiments, however, the processing of the booking and the preparation of the booking-response data is not performed solely by the server, but includes co-operation of the server with external systems, such as other servers and/or databases in the background. For example, booking and/or payment transactions may include remote database queries, inquiries at credit-card payment providers, etc. Hence, in the latter embodiments, the server only initiates the processing of the booking and the preparation of the booking-response data, e.g., by forwarding the contents of the booking request, or parts of it, to external systems. In some embodiments, preparing the booking-response data may therefore last several seconds, e.g., more than 10 or 20 seconds. Such jobs initiated by the first booking request and preparing the booking-response data are therefore also referred to as long-running jobs.

The "repeated booking request" is a repetition of the first booking request. It may happen that the first booking request is sent again, due to faulty or incorrect operation by the user, for example when the user gets impatient since the long-running job does not immediately provide the booking response. For example, an impatient user, while waiting for the booking response, might repeat the first booking request by refreshing it in the Web browser (by pressing a refresh key or clicking a refresh button), or by using the back button and then the forward button in the Web browser. Besides impatience, the repetition of a booking request may also be provoked by a temporary Internet outage causing the previous communication to be repeated. The repeated request is typically identical with (i.e., duplicate) the first request.

In some embodiments in which the client receives and executes mobile program code, rather than just HTML, the repetition of the first request may also be intentionally and automatically performed by the mobile program code, as will be explained in more detail below.

Different Connections

Conventionally, in the prior art, when a client, e.g., a Web browser issues a second request before the response to the first request has been received, the client will not receive or display the response to the first request because the TCP connection established between the client and the server to transmit the first request and its response will be closed when the second request is issued. Owing to this, the repetition of a booking request identical with the first might result in double booking without the user even being provided with an indication that double booking has occurred.

Double booking due to repeated booking requests is avoided in the server-side method described herein by two measures (i) and (ii) applied in combination, as follows. In response to the receipt of a repeated booking request from the client (i.e., a repetition of the first booking request), (i) the server prevents the repeated booking request from initiating another booking process; and (ii) the server assigns response data prepared in response to the first booking request, or alternatively in response to a booking-result request, to the repeated booking request or the booking-result request, and returns, in response to the repeated booking request or the booking-result request, a response to the client comprising the booking-response data prepared in response to the first booking request.

While the repeated booking request is identical with the first booking request (typically transmitted over a newly established TCP connection), the booking-result request is not a repetition of the first booking request, but is distinct from the first booking request. It is, therefore, not identical with the first booking request.

In some embodiments, for example, the server processes the first booking request and stores the prepared result data at least temporarily in storage, for example in a database. This may be a step-wise process in which result data from various internal and/or external applications and sources is compiled. If a repeated booking or a booking-result request is received, the server assigns the result data prepared in response to the first booking request to the second booking request or to the booking-result request, and returns the result data in response to the second booking request or to the booking-result request, respectively.

This can be considered to be "response swapping" because the client, technically at the request-response protocol level, gets no response to its first request but only to the repeated request or the booking-result request, while the booking-response contents prepared at the server-side in response to the first booking request is swapped with the response to the repeated request or the booking-result request to be sent to the client. Thereby, double booking is avoided.

This response swapping will be transparent (i.e., not recognizable) to the user. According to one alternative, the response to which the booking result is swapped is a response to a repetition of the first booking request. In this alternative, the transparency will be due to the identity of the first booking request with the repeated booking request; the contents of the booking response displayed to the user will be consistent with both the first and the repeated request.

According to the other alternative, the request does not repeat the first booking request, but is instead a different booking-result request. However, because the booking-result request is automatically generated at the client in some embodiments (i.e., without any user interaction), the user will get the impression that the response finally received and displayed by the client is a response to the first booking request.

The server-side method to prevent double booking may be carried out by a server computer program, e.g., coded in a server script language such as Perl® or PHP®. The server computer program causes the server computer system to receive a first booking request from the client application over the computer network and process the first booking request, wherein the processing of the first booking request comprises initiating the preparation of response data for the client. If the server receives a repetition of the first booking request, the computer program causes the server computer system to prevent the repeated booking request from initiating another booking process, to assign the response data prepared in response to the first booking request to the repeated booking request or a booking-result request, and to return response data to the client in response to the repeated booking request, or the booking-result request, and prepared in response to the first booking request.

Response Swapping

In some embodiments, the request-response protocol used in the transmission of the booking requests and the responses to the booking requests is based on a connection-oriented transport protocol, such as TCP. In some embodiments, the Web browser establishes a new transport-protocol connection (e.g., TCP connection) for each booking request and for the booking-result request, if applicable. This means, in these embodiments, that the first booking request is received by the server in a first transport-protocol connection, and the repeated booking request, or the booking-result request, is received by the server in a another transport-protocol connection different from the first transport-protocol connection. Therefore, in these embodiments, the "response swapping" mentioned above means that the response data prepared in response to the first booking request is returned by the server within the other transport-protocol connection associated with the repeated booking request, or the booking-result request.

In some embodiments, a repeated booking request is prevented from causing another booking process to be initiated by the interception of booking requests received at the server. In these embodiments the server ascertains whether a booking request is a repetition of a previous booking request which is still outstanding, i.e., to which no response with booking-response data has yet been returned. If the outcome is negative, i.e., if the booking request at issue is found to be a first booking request rather than a repetition of a previous and still outstanding booking request, the server enables a booking process corresponding to the first booking request to be initiated, for example by forwarding the booking request to a booking server so that a booking process is initiated. However, if the booking request at issue is found to be a repetition of a first (still outstanding) booking request, the server prevents a booking process corresponding to the repeated booking request from being initiated, e.g., by barring the forwarding of the booking request to a booking server.

Session Identification

Recognizing that the first and the repeated booking requests belong together, and that the latter is a repetition of the first booking request, may be based on the assumption that two requests from the same client coming within a given maximum time interval (i.e., a maximum delay) from the first request belong to the same session. The client may be identified by the source IP address in the request, as it has a static IP address, or by a file with client-identification information stored at the client (a so-called "cookie") which is transmitted to the server along with the requests.

However, in some embodiments, the server's recognition that the first booking request and the repeated booking request belong together, and that the latter is a repetition of the first booking request, is achieved on the basis of a session identifier. The session identifier is included in the first and the repeated booking requests. For example, in embodiments in which HTTP is used as the request-response protocol, the session identifier may be transmitted from the client to the server as a part of the URI (uniform resource indicator) in the first and the repeated booking requests.

In some of these embodiments, the session identifier is provided to the client. The server analyses session identifiers in booking requests received from the client. The server recognizes a booking request as a repeated booking request, i.e., a repetition of a first booking request, on the basis of the session identifiers in the first booking request and the repeated booking request.

In some of these embodiments, the session identifier is provided to the client before the first booking request is received at the server (i.e., before it is sent by the client). The session identifier can, for example, be provided by the server storing a file with identification information (a "cookie") and session numbering information at the client or by including the session identifier in a Web page preceding the booking request and including a reference to an URI in which the session identifier is embedded. Clicking this reference will issue the first booking request to the server along with the session identifier in the URI.

Mobile Computer Code to Display Booking-Status Information

The double-booking-prevention method and its various embodiments described so far do not require any special programming at the client side. As a result, they can be carried out at the client side by a Web browser not able to execute any mobile program code embedded or referenced in HTML documents, but only able to display HTML documents without embedded or referenced mobile program code, such as JavaScript® or Java® code. The client may therefore be a Web browser in which the execution of mobile program code in Web pages, such as JavaScript® and Java®, is disabled.

In some embodiments, the browser is also able to execute mobile program code received in an HTTP response and embedded or referenced in an HTML document, such as mobile program code written in a script language interpreted by the browser, such as JavaScript®, or machine-independent bytecode interpreted by the client computer, such as a Java® applet.

However, alternatively, the double-booking-prevention method and its various embodiments described so far may use mobile program code received by the browser in an HTTP response, embedded, or referenced in an HTML document, and written in a script language, such as such as mobile program code written in a script language interpreted by the browser, such as JavaScript®, or machine-independent bytecode interpreted by the client computer, such as a Java® applet. For security reasons, the mobile program code may be encapsulated in a particular region of the client-side computer and may have only limited rights to access any other computer system; this is also referred to as operation in a "sandbox". Code expressed in a mark-up language, such as HTML, is not considered herein to be "mobile program code".

The use of mobile program code at the client enables the server to take a more active role in the client-server communication, for example, by enabling content to be pushed from the server to the client. In some embodiments, the server push is an apparent push, realized by the client by repeatedly requesting the server whether the server wants to return content and receiving the server's responses, e.g., by means of repeated HTTP requests. Issuing repeated HTTP requests to the server may be caused by mobile code executing at the client in the background; i.e., enabling the browser to send requests to the server and handling the server responses without reloading the page in the process, i.e., in an asynchronous manner, e.g., using AJAX "Asynchronous JavaScript® and XML", also referred to as "AJAX", or "JavaScript® and JSON", also referred to as "AJAJ". In other embodiments, a real server push is used, by the server sending messages to the client without having received a corresponding HTTP request from the client. This is based, for example, on direct communication between the server program at the server and the mobile program code at the client outside the HTTP protocol, e.g., by exchanging objects of the mobile program code (such a JavaScript® objects) using the existing TCP connection.

In some embodiments, the server push functionality (be it an apparent or a real push) is used to display status information about the progress of the booking process initiated by the first booking request at the client. In these embodiments, processing of the first booking request further comprises (i) sending mobile program code to the client over the computer network in response to the first booking request, and (ii) sending status information indicative of a status of the processing of the first booking request over the computer network to the client; (iii) the status information being displayed by the mobile program code at the client.

When a first booking response is received from the client, the server initiates the booking process, for example by forwarding the booking request to an external booking server, as explained above. The server also performs the activity (i), i.e., it embeds the mobile program code in an HTML document which it returns to the client in response to the first booking request.

While the booking process is ongoing, the activities (ii) and (iii) may be repeated several times, so that the client repeatedly gets updated booking status information and updates its display to reflect the current status of the booking-request processing. For example, the status information may be in the form of a progressing status bar or clock which displays the progress of the ongoing booking process dynamically.

The client-server communication on the basis of the mobile program code executed at the server enables the client and server to establish long-lasting communication e.g., over a long-lasting transport-protocol connection (e.g., a TCP connection) between client and server. The transport-protocol connection may be established by the client for transmitting the first booking request, and may then be further sustained beyond the point of time when the HTML document with the mobile program code is received, over the entire period during which the mobile program code is executing. During the long-lasting transport-protocol connection, the client may repeatedly receive booking-process-status updates, either pulled from the server by requests issued by the client (apparent push), or pushed by the server to the client (real push).

Although displaying progressively updated status information will reduce the risk that a user gets impatient, it still may happen that the first booking request is re-submitted due to faulty or incorrect operation by the user, e.g., by refreshing the first booking request or by actuating the back button and then the forward button.

As described at the outset, upon receiving the repeated booking request, the server prevents the repeated booking request from causing another booking process. In some of the embodiments with mobile program code executed at the client to present status information to the user, the repetition of the first booking request will cause the server to re-submit the same response which was already returned in response to the first request, i.e., said HTML document with the status-informing mobile program code.

Once the repeated booking request is sent from the client, the execution of the mobile code in the first HTML document will be terminated, and the execution of the (same) mobile code then received in the HTML document re-submitted by the server will be initiated in the Web browser. Since the mobile code re-accesses and displays the current status information, there will be a seamless transition of what is displayed. Hence, the user will not notice any significant effect of sending the repeated booking request.

When the booking process is finished at the server side and in some embodiments, the booking result (i.e., the booking-response data) is transmitted over the long-lasting (i.e., persistent) transport-protocol connection to the client, and is then displayed by the mobile program code at the client.

In other embodiments, the mobile program code executing at the client is caused by the server to issue an HTTP request for the booking result, once the booking process is finished at the server side. The server may trigger this HTTP request by sending an output-ready message to the client in response to the completion of the first booking request. There are at least two alternative ways for the mobile program code to generate this request. In some embodiments and under a first alternative, the request for the booking result is only implicit; it is actually realized by a repetition of the first booking request that is automatically generated by the mobile program code in response to the output-ready message (it is therefore also referred to as "mobile-code-issued repeated booking request"). In other embodiments and under a second alternative, the request is an explicit booking-result request different from the first booking request; the mobile program code generates the booking-result request in response to the output-ready message.

The repeated booking request and the booking-result request may be HTTP requests. After having issued the repeated booking request or the booking-result request, the mobile program code terminates, i.e., passes control back to the Web browser. Hence, the server's response to the repeated booking request or the booking-result request is a new HTTP response directly loaded and displayed by the client's Web browser; it is not a response sent to the mobile program code and displayed by the mobile program code, because at that stage the mobile program code executed previously to provide updating booking status information has already terminated.

One of the reasons for providing the alternatives is as follows. Some Web browsers are restrictive and do not enable any HTTP requests to be generated from within mobile program code other than a refresh, which causes the previous HTTP request to be repeated. The first alternative deals with such restrictive Web browsers. After the output-ready message is received, the mobile program code causes the refresh operation, whereupon the Web browser generates a repetition of the first booking request. When the server receives the repeated booking request at this stage (now being aware that the booking process has finished and the booking result can be provided to the client), it does not return the initial response with the status-informing mobile program code any more. It now rather returns the booking result, e.g., as an HTTP response with the booking-response data.

Other embodiments implementing the second alternative rely on less restrictive Web browsers, which enable HTTP requests to be generated from within mobile program code; i.e., HTTP requests not restricted to a refresh of the previously submitted HTTP request. There may be a restriction which does not allow HTTP requests to other Web sites to be generated. Nevertheless, even under such a restriction, as long as the request is directed to a URI at the same Web site as the initial booking request, the less restrictive Web browser allows a specific booking-result request to be generated, which has a different URI and/or content different from that of the first booking request. When the server receives the booking-result request, it returns the booking result, e.g., as an HTTP response with the booking-response data.

Redirection

As can be taken from the explanation above, in some embodiments using mobile-program code to present booking-status information to the user during the processing of the booking, the communication between the client and the server can be classified into two different types. One type relates to the first booking requests and to the repeated booking request or booking-result request, which are HTTP requests. The other type relates to booking-status communication between the client and the server under the control of mobile-program code, in which the mobile-program code repeatedly issues requests for booking-status information and/or repeatedly receives booking-status information from the server. This other type of communication allows the server to push booking-status information by an apparent or actual push.

In some of these embodiments, a transition from the first communication type to the second communication type is performed after the server's response to the first booking request.

Accordingly, in some embodiments, the server comprises a first functional module that intercepts booking requests, also referred to as intercepting module, or "AsyncFilter", and a second functional module that primarily deals with booking-status information, also referred to as status-informing module, or "AsyncServlet". In response to the receipt of the first booking request (e.g., an HTTP request) at the intercepting module, a booking process is initiated corresponding to the first booking request, and the first booking request is also directed to the status-informing module. In some of these embodiments, if a repeated (HTTP-) booking request, e.g., due to faulty or incorrect operation by the user, is received at the intercepting module at a stage before the processing of the first booking request has finished, the repeated booking request is re-directed to the status-informing module.

In some embodiments, the HTTP request for a booking result, i.e., the repeated booking request or the booking-result request, is also handled by the server's intercepting module. Accordingly, when the first booking request is finished, the client is re-directed to the intercepting module by causing the repeated booking request or the booking-result request to be addressed to the intercepting module. The booking-response data prepared in response to the first booking request is swapped to the response to the repeated booking request or the booking-result request and is then returned to the client in response to the repeated booking request or the booking-result request.

Confirmation

At the final stage of receiving and displaying the booking result, an error could occur that may prevent the booking result from being displayed, which in turn might confuse the user as to whether the booking transaction has been successfully terminated, and prompt the user to re-submit the booking request.

In view of the potential for an error, in some embodiments, the booking-response data is not immediately discarded at the server after it has been submitted to the client. The booking-response data prepared in response to the first booking request is rather maintained in storage at the server. The client is caused to return a confirmation that the response to the client comprising the booking-response data has been received and displayed. The booking-response data prepared in response to the first booking request is only discarded at the server in response to a receipt of confirmation from the client over the computer network.

Such a confirmation may be automatically generated, e.g., by corresponding mobile-program code embedded or referenced in the HTML document containing the booking response causing the client to send a confirmation message to the server once the booking response has been displayed. An alternative implementation of the confirmation functionality, which is not based on mobile program code, uses an HTTP redirect. The HTML document containing the booking response redirects the client to another URI at the server; the receipt of the redirected HTTP request is considered to be a confirmation that the booking result has been displayed at the client.

Mobile Code to Display Booking-Status Information; Mainly Client Side

While some of the embodiments of the server-side method do not require the client to be provided with any mobile-program code, in other embodiments, the client is provided with mobile code adapted to the methodologies of the latter server-side embodiments.

Those embodiments, therefore, have a special counterpart at the client side, based on mobile program code to be executed at the client. From the client's perspective, embodiments of the method carried out by the client comprise sending a first booking request to the server. The client then receives the mobile program code from the server over the computer network in response to the first booking request. Upon processing the mobile program code, the client displays booking status information received over the network and indicative of a status of the processing of the first booking request. The displayed booking is repeatedly updated, on the basis of repeated communication between the client and the server to obtain booking-status updates. In response to the user causing a repetition of the booking request, the execution of the mobile program code is terminated, and the same mobile program code is received again with the response to the repeated booking request. The newly received mobile program code is started anew. As the newly started mobile program code will receive about the same status information from the server—apart from some progress the server might have made in the interim processing the first booking request—the transition from the first booking request to the repeated booking request appears to happen seamlessly, and will hardly be noticed by the user. In response to the receipt of an output-ready message from the server, the mobile program code at the client sends a repeated booking request or a booking-result request to the server. The client then receives and displays booking-response data from the server in response to the repeated booking request or a booking-result request, and prepared in response to the first booking request.

Response Swapping; Client Side

As described above in connection with embodiments of the server-side method, in some embodiments of the client-side method the first booking request is transmitted in a first transport-protocol connection to the server, and the repeated booking request or the booking-result request is transmitted in another transport-protocol connection different from the first transport-protocol connection to the server.

Session Identification; Client Side

In some embodiments, a session identifier is included in the first and repeated booking requests and optionally the booking-result request (if there is a booking-result request). The session identifier is received from the server prior to the sending of the first booking request, thereby enabling the server to recognize that the repeated booking request is a repetition of the first booking request on the basis of the session identifiers in the first and repeated booking requests, and that the booking-result request refers to the first booking request, if applicable.

Confirmation; Client Side

In some embodiments, in response to the receipt and display of booking-response data prepared in response to the first booking request from the server over the computer network, the client sends a confirmation to the server that the booking-response data has been received and displayed.

Server- and Client-Computer Programs

In some embodiments, the server computer program is a Web server, such as an Apache® server, programmed, e.g., with a server script language, such as Perl® or PHP®, to dynamically generate HTML documents to be sent to the client, and to carry out the server-side part of the methodologies described herein. The server may be in communication with external systems, such as other servers and/or databases in the background. The server computer program may be stored in the server computer system on a non-transitory computer-readable storage medium, such as a magnetic disk.

The client computer program comprises, for example, a Web browser, i.e., a software application for retrieving, presenting and traversing information resources on the World Wide Web, and is able to communicate with a Web server in accordance with the HTTP protocol and to process and display HTML documents. Suitable Web browsers include, but are not limited to, Chrome®, Firefox®, and Internet Explorer®. The client computer program further comprises mobile program code embedded or referenced in an HTML document received in an HTTP response from the server, such as JavaScript® code or Java® code. After receipt and during processing the client computer program is stored in computer-readable storage medium, such as in the client computer's main memory.

FIG. 1: Overview, First Type

Returning to FIG. 1, a schematic overview of a first exemplary type of a client-computer and server-computer system is shown, which is the basis of various embodiments illustrated in FIGS. 2 to 5.

The system in FIG. 1 includes a server 13 to which a client 1 is connected via a network, such as the Internet. The server has a booking interceptor 3 that receives booking requests from the client 1, a processing manager 5 that receives booking requests from the booking interceptor 3 and starts the processing of these booking requests, as indicated by the label "process start". Furthermore, the processing manager 5 may have interfaces to external systems 7 for communication with other servers that may process parts of the booking process.

The server 13 further comprises an optional notification manager 9 that manages notifications to the client indicative of the status of the booking-request processing. The server 13 also comprises an optional response cache 11 in which response data prepared in response to a booking request may be stored. The booking-response data may be generated by the booking interceptor 3, the processing manager 5 and/or notification manger 9.

Figure 2:
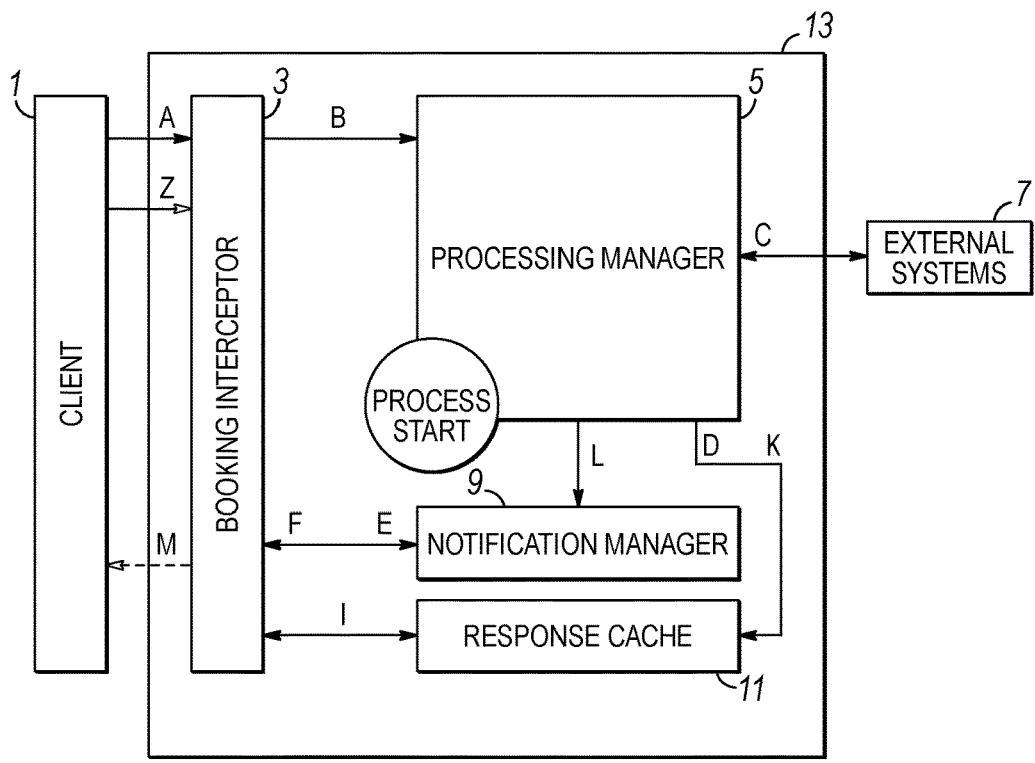
FIG. 2 illustrates an embodiment with a repeated booking request caused by the user in a client-server computer system of the first type.

FIG. 2: Repeated Booking Request, First Type

FIG. 2 illustrates an embodiment based on the system of FIG. 1 with a repeated booking request caused by the user in a client-server computer system of the first type. The description of FIG. 1 also applies to FIG. 2.

The booking interceptor 3 of the server 13 receives a first booking request from client 1, labeled as "A", over the network, e.g., an HTTP request in a TCP connection established by the client 1. The first booking request may also contain a session identifier.

The booking interceptor 3 intercepts the first booking request, recognizes that it is a first booking request (rather than a repeated booking request in the same transaction), and therefore forwards the request to the booking manger 5, labeled as "B". The processing manager 5 initiates the processing of the first booking request, whereby it may co-operate with the external systems 7, labeled as "C", and also referred to as the "long-running job". The booking interceptor 3 also stores the first booking request, or a part of the first booking request, which enables a repetition of the first booking request to be recognized, such as a session identifier included in the first booking request. The processing manager 5 prepares booking-response data and/or receives booking-response data from the external systems 7, e.g., flight, car rental, hotel, etc. booking data, and stores the booking-response data in the response cache 11, labeled as "D". The processing manager 5 may inform the notification manager 9 about the current status of the booking, labeled as "L". The booking interceptor 3 may optionally initiate a notification process in the notification manger 9; this initiation is labeled as "E". The notification process informs the booking interceptor 3 about the status of the booking process, e.g., about finished parts of the booking-response data of the ongoing booking process, labeled as "F".

FIG. 2 also illustrates the case in which the server 13 receives a repeated booking request, labeled as "Z", while the booking processing initiated by the first booking process is still ongoing. This can be due to faulty or incorrect operation by the user; e.g., it may happen if the client performs a browser refresh, or if the link which caused the first booking request to be issued is clicked again, while the booking process is still ongoing. In this manner, the server 13 may receive two or more identical booking requests (HTTP requests) from the client 1. The client 1 establishes a new TCP connection to transmit the repeated request.

The booking interceptor 3 intercepts the repeated booking request. This may be, for example, by the detection of a session identifier in the repeated booking request that is the same as in the first booking request, upon which the booking interceptor 3 associates the repeated booking request with the first (i.e., initial) booking request and considers it to be a repetition of the first booking request. Optionally, the booking interceptor may further ascertain whether this second request is indeed a repetition of the first request, e.g., by comparing it with the stored first request. If the booking interceptor 3 considers the second request to be a repetition of the first booking request, and if the first booking process is still ongoing, the interceptor 3 does not forward the booking request to the processing manager 5 to prevent another booking process from being initiated. Hence, the processing manager 5 continues to process the first booking request.

As mentioned, during the booking process, the processing manger 5 stores the booking-response data in the response cache 11. The booking-response data may be received from various external systems 7 at different points of time. This means the booking-response data may be received in an incremental manner; accordingly, the processing manager 5 may store the booking-response data incrementally in the response cache 11. The optional incremental generation of the complete booking result by transferring and storing parts of the booking result is labeled as "D" and "K". When the booking process has finished, the entirety of the stored parts of the booking result forms the complete booking result. Optionally, the processing manager 5 may repeatedly inform the notification manager 9 about the current status of the booking, labeled as "L".

The booking interceptor 3 and the response cache 11 maintain a single response wrapper object for a transaction session. Optionally, the response wrapper contains a single response object, wherein a response object represents a TCP connection between the client 1 and the server 13. When the repeated booking request is received, the first TCP connection (established by the client before the first booking request was sent) is broken. The response wrapper is thus updated with the new response object (representing the new TCP connection between the browser and the server, associated with the repeated request). Upon receipt of the repeated booking request, the booking interceptor 3 ascertains in the response cache 11 whether a first booking request is being processed; if the answer is positive, the booking interceptor 3 reassigns the booking-response data belonging to this session that are already stored and will be stored in the response cache 11 to the repeated booking request. By assigning the booking-response data to the single response wrapper and updating the response wrapper with the new response object, the booking-response data (which are processed in response to the first booking request) may be "swapped" upon the repeated request.

The booking-response data is forwarded from the response cache 11 to the booking interceptor 3, labeled as "I". In the case of a repeated booking request the swapped booking-response data is forwarded from the response cache 11 to the booking interceptor 3, also labeled as "I". The booking interceptor 3 sends the booking-response data to the client 1, labeled as "M". In the case of a repeated request, the booking interceptor 3 sends the (swapped) booking-response data to the client 1 in response to the repeated request, i.e., within the TCP connection associated with the repeated request, also labeled as "M".

Figure 3:
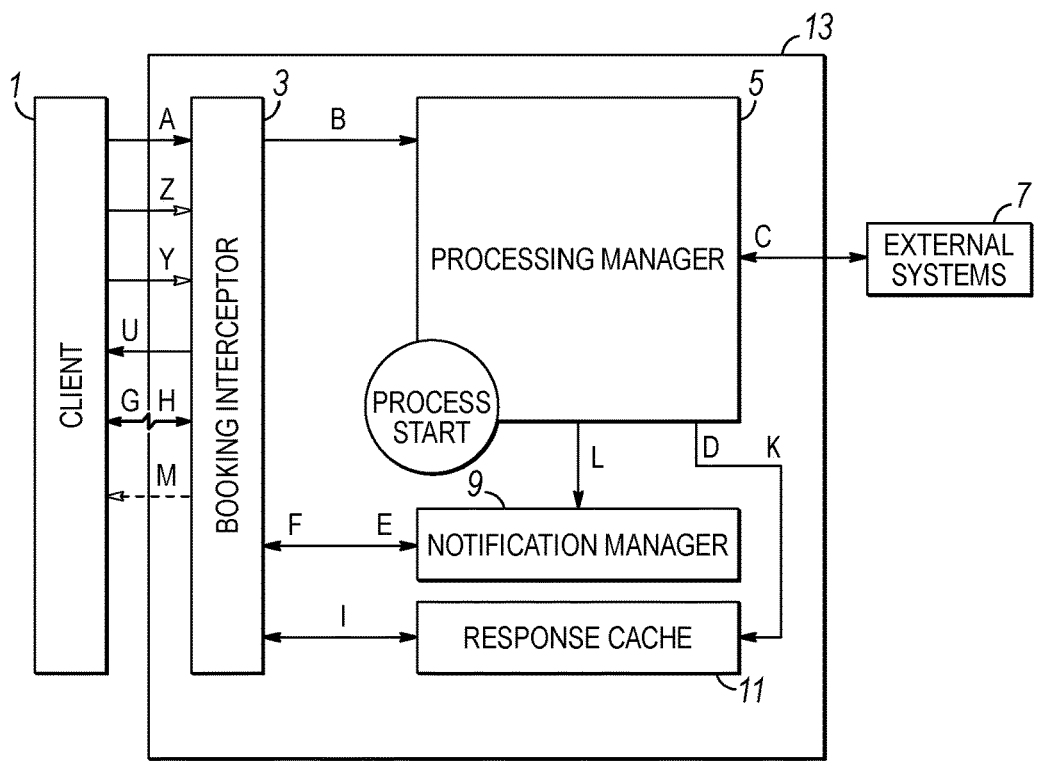
FIG. 3 illustrates an embodiment similar to FIG. 2 in which mobile program code is sent to the client in order that booking-process status information is displayed at the client during booking processing.

FIG. 3: Booking-Process Status Information, First Type

FIG. 3 illustrates an embodiment in which mobile program code is sent to the client. The description of FIGS. 1 and 2 also applies to FIG. 3, in combination with the additions and variants described in this subsection dealing with FIG. 3.

In the embodiments of FIG. 3, mobile program code is sent to the client. The mobile program code, when executed within the Web browser of the client, performs booking-status-related communication between the client and the server and causes information about the status of the booking process to be displayed at the client. Optionally, the mobile program code also automatically issues a repeated booking request, or a booking-result request, when the client is informed that the booking process is finished. This is now described in more detail.

In response to the first booking request, the booking interceptor 3 sends, as an HTTP response, an HTML document with embedded or referenced mobile program code to the client 1, labeled as "U". The mobile program code may be code written in a script language interpreted by the browser, such as JavaScript®, or machine-independent bytecode interpreted by the client computer, such as a Java® applet. The client 1 executes the mobile program code within its Web browser.

The mobile program code enables booking-status information to be transferred to the client in a progressive manner while the booking process is still ongoing in the background, i.e., during the time period in which the processing of the booking request takes place. The progressive booking-status information is provided from the notification manager 9 and/or the response cache 11 to the booking interceptor 3. The booking interceptor 3 transmits the progressive booking-status information to the client 1.

The booking interceptor 3 of server 13 may effectively push the booking-status information and other information, such as an output-ready message, to the client 3. In some embodiments the server push is an apparent push, realized by the mobile program code at the client 3 by repeatedly requesting the server 13 to by means of HTTP requests to send updated booking-status information. In some embodiments, the repeated status-requests may actually be requests for booking-status updates, because it is sufficient for the mobile code to add update information to its status display. This activity is labeled in FIG. 3 by "H". All these requests may be transmitted within a TCP connection established by the client 1 with the first booking request and maintained open. In response to these requests issued by the mobile-program code, the booking inceptor 3 returns the requested booking status information, e.g., booking status updates, as HTTP responses to the client, labeled as "G". These booking status updates are indicative of the current status of the booking process being carried out in the background by the processing manager 5, e.g., in co-operation with the external systems 7. Technically, in this embodiment, the booking-status information is pulled by the client 1 from the booking interceptor 3. However, as the pull happens automatically and repeatedly, the content appears to be pushed to the client 1; therefore, it can be considered to be (effectively) a push.

In other embodiments, a real server push is used, by the booking interceptor 3 sending messages with booking status information, which may be booking status updates, to the client 1, labeled as "G", without having received a corresponding HTTP request from the client 1. This is based, for example, on direct communication between the server program at the server 13 and the mobile program code at the client 1 outside the HTTP protocol, e.g., by exchanging objects of the mobile program code (such as JavaScript® objects) using the existing TCP connection.

Thus, technically, the booking-status information is either pulled by the client 1 from the booking interceptor 3, or pushed to the client 1 by the booking interceptor 3 within a TCP connection between client 1 and server 13 during the time period in which the processing of the booking request takes place.

The progressive booking-status information may be displayed to the user, and the display may be repeatedly updated, e.g., in the form of a progress bar; progress circle, or the like.

Although displaying progressively updated status information will reduce the risk that a user gets impatient, it still may happen that the first booking request is re-submitted due to faulty or incorrect operation by the user while the booking process is still ongoing, e.g., by refreshing the first booking request or by actuating the back button and then the forward button, as in FIG. 2. Hence, the server 13 receives two or more identical booking requests from the client 1. The re-submission of the first booking request is also labeled as "Z" in FIG. 3.

As in FIG. 2, the booking interceptor 3 has previously intercepted the first booking request, and initiated the processing of the first booking request. The booking interceptor 3 also intercepts the repeated booking request and recognizes that it is a repetition of the first booking request, while the first booking process is still ongoing, as in FIG. 2. Accordingly, the interceptor 3 does not forward the repeated booking request to the processing manager 5 to prevent another booking process from being initiated. Hence, the processing manager 5 continues to process the first booking request, as in FIG. 2.

Once the repeated booking request is sent from the client 1, the execution of the mobile code will be terminated. In response to the receipt of the repeated booking request, while the booking process initiated by the first booking request is still ongoing, the booking interceptor 3 re-submits the HTML document with the embedded or referenced mobile program code to the client 1, again labeled as "U" in FIG. 3. Upon receipt, execution of the (same) mobile-program code is started in the client's Web browser again. The newly started mobile program code re-accesses and displays the current status information. As this interruption of the mobile-program-code processing will be relatively short, the status of the booking processing will not have changed a lot; therefore, the apparent transition between what is displayed before and after a repetition of the booking request to the user will nearly be seamless.

The server may trigger this HTTP request by sending an output-ready message to the client in response to completion of the processing of the first booking request.

Once the booking process initiated by the first booking request has finished the processing manager 5 informs the notification manager 9 about the completion of the booking process, labeled as "L", which, in turn, informs the booking interceptor 3. Thereupon, the booking interceptor 3 sends an output-ready message to the client 1. In analogy with the transmission of the booking-status information, in some embodiments, the output-ready message may be automatically pulled by the client 1 (which appears to be a push); in other embodiments, the output-ready message is actually pushed by the server 13 to the client 1.

The receipt of the output-ready message causes the mobile program code executing at the client 1 to issue another HTTP request in a new TCP connection, labelled by "Y", in order to obtain the final booking result. This other HTTP request causes the response cache 11, via the booking interceptor 3, to swap the booking-response data representing the final booking result prepared in response to the first booking request to this other HTTP request. The final booking result swapped to the other HTTP request is then forwarded to the booking interceptor 3 and returned by the booking interceptor 3 to the client 1 as an HTTP response to the other HHTP request, labeled as "M", i.e., within the new TCP connection established to transmit the other HTTP request, labeled as "M". After having issued the other HTTP request, the mobile program code terminates, i.e., relinquishes control to the Web browser.

There are two alternatives embodiments of this other HTTP request that may be generated in response to the output-ready message to obtain the final booking result.

In one embodiment, the other HTTP request is a repetition of the first booking request automatically generated by the mobile program code in response to the output-ready message, i.e., a repeated booking request issued by mobile code. The server 13 deals with this repeated booking request issued by the mobile code in the same manner as with the repeated booking requests initiated by the user (FIG. 3). The booking interceptor 3 intercepts the repeated booking request issued by the mobile code and recognizes that it is a repetition of the first booking request. However, as the booking interceptor 3 is now aware of the fact that the booking process is finished, it now returns the final booking result to the client 1 (rather than the HTML page with the status-displaying mobile program code), swapped to the HTTP response to the repeated booking request issued by the mobile code.

In another embodiment, the other HTTP request is not a repetition of the first booking request, but is a booking-result request different from the first booking request. The server 13 deals with the booking-result request in a manner similar to that of the user-initiated repeated booking requests of FIG. 3. The booking interceptor 3 intercepts the booking-result request and recognizes that it refers to the first booking request, e.g., by means of the same session identifiers in the first booking request and the booking-result request. The response cache 11 swaps the final booking result generated in response to the first booking request to the response to the booking-result request. The booking interceptor 3 returns the final booking result swapped to the HTTP response to the booking-result request.

The final booking result is then displayed by the client's Web browser. The booking result data is discarded from the response cache 11.

Figure 4:
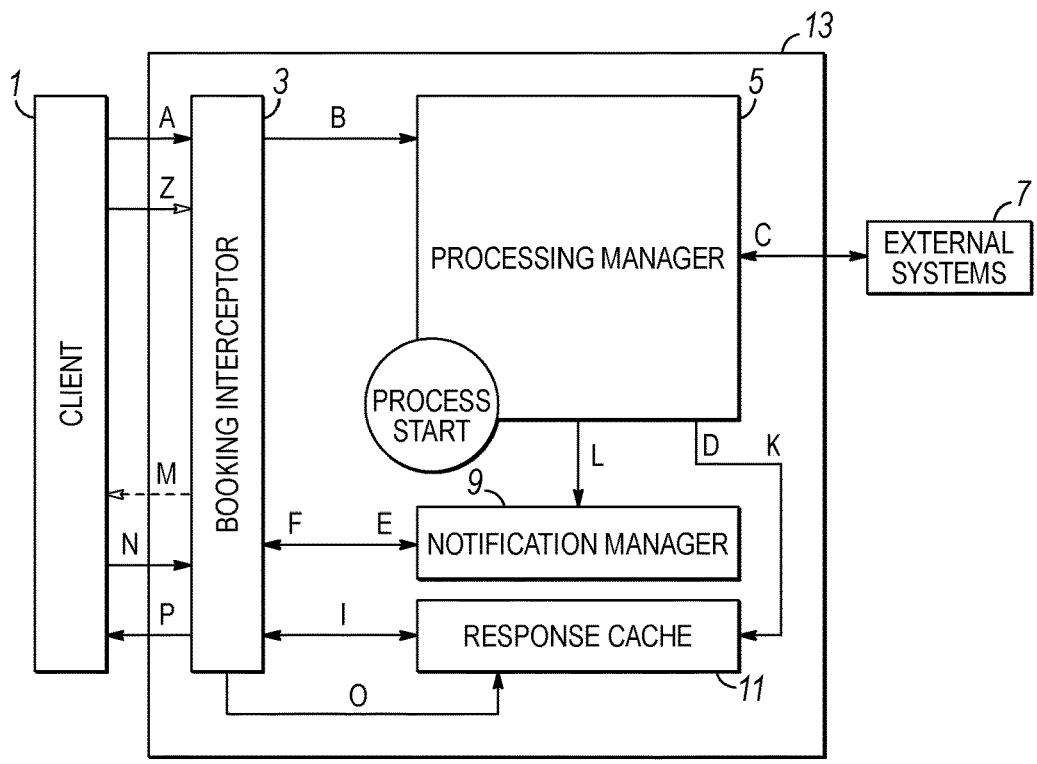
FIG. 4 illustrates an embodiment corresponding to that of FIG. 2 with booking confirmation.
Figure 5:
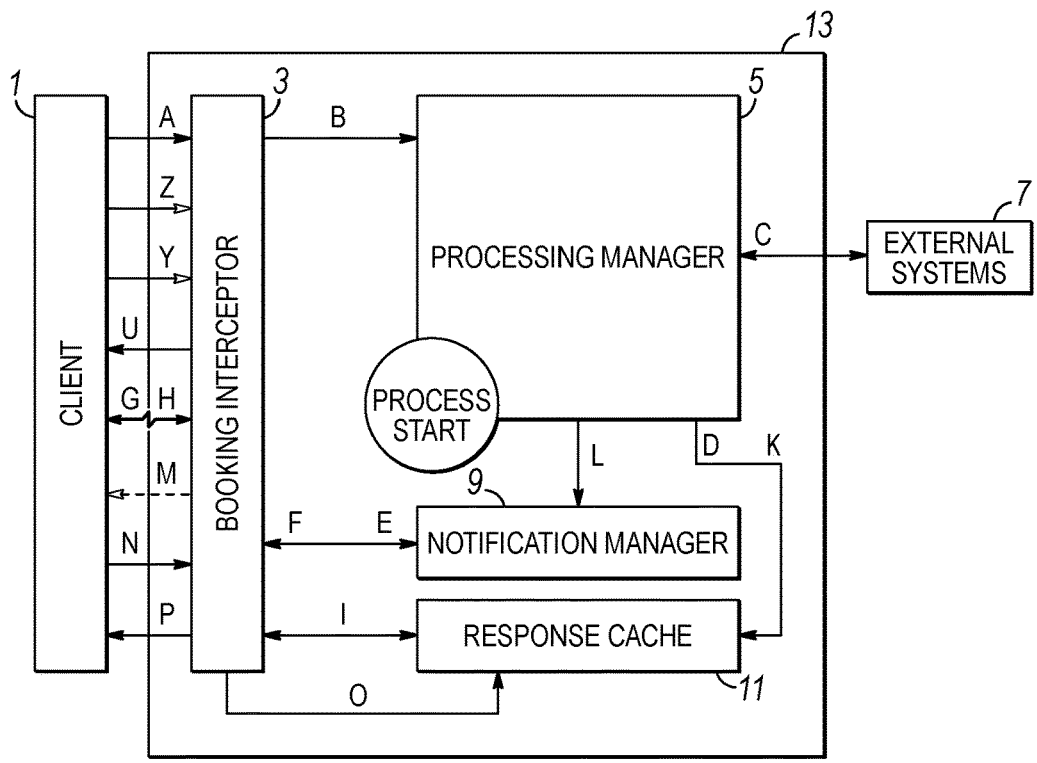
FIG. 5 illustrates an embodiment corresponding to that of FIG. 3 with booking confirmation as in FIG. 4.

FIGS. 4 and 5: Confirmation, First Type

FIGS. 4 and 5 illustrate embodiments in which the client 1 returns a confirmation to the server 13 that the final booking result has been received and displayed at the client. Having received this confirmation, the server 13 can be certain that the booking-response data for the booking transaction at issue are not needed for any further response-swapping activity anymore, and can therefore be discarded from the response cache 11.

The description of FIGS. 2 and 3 also applies to FIGS. 4 and 5, respectively, in combination with the additions and variants described in this subsection dealing with FIGS. 4 and 5.

The booking-response data is not immediately discarded from the response cache 13 after having been sent to the client 1. The storage of the booking-response data in the response cache 13 is rather extended to a point of time when a confirmation is received from the client 1 that the final booking result has been received and displayed at the client 1.

The client is required to return a confirmation that the response to the client comprising the booking-response data has been received and displayed. The booking-response data prepared in response to the first booking request is only discarded at the server in response to the receipt of the confirmation from the client over the computer network.

Such a confirmation, labeled as "N", is caused by the final HTTP response by which the client 1 receives the final booking result, labeled as "M". In one embodiment, the confirmation in the form of a confirmation HTTP request is achieved by an HTTP redirect order in the final booking response M which causes the client 1 to re-issue it previous HTTP request (which is the repeated booking request, or the booking result request) to another URI of the booking interceptor 3. In another embodiment, the confirmation is achieved by mobile program code embedded or referenced in the final booking response M; this mobile program code is then executed in the client's browser and causes a confirmation HTTP request to be returned to the booking interceptor 3.

In response to the receipt of the confirmation from client 1, the booking interceptor causes the booking-response data prepared in response to the first booking request to be discarded from the response cache 11, labeled as "O".

Optionally, the server 13 may send a response to the confirmation to complete the HTTP request-response protocol, labeled as "P". In the absence of such a response to the confirmation, the browser at the client 1 could display an error notification (e.g., a time-out notification) that could leave the user in doubt whether the booking process was completed successfully.

Figure 6:
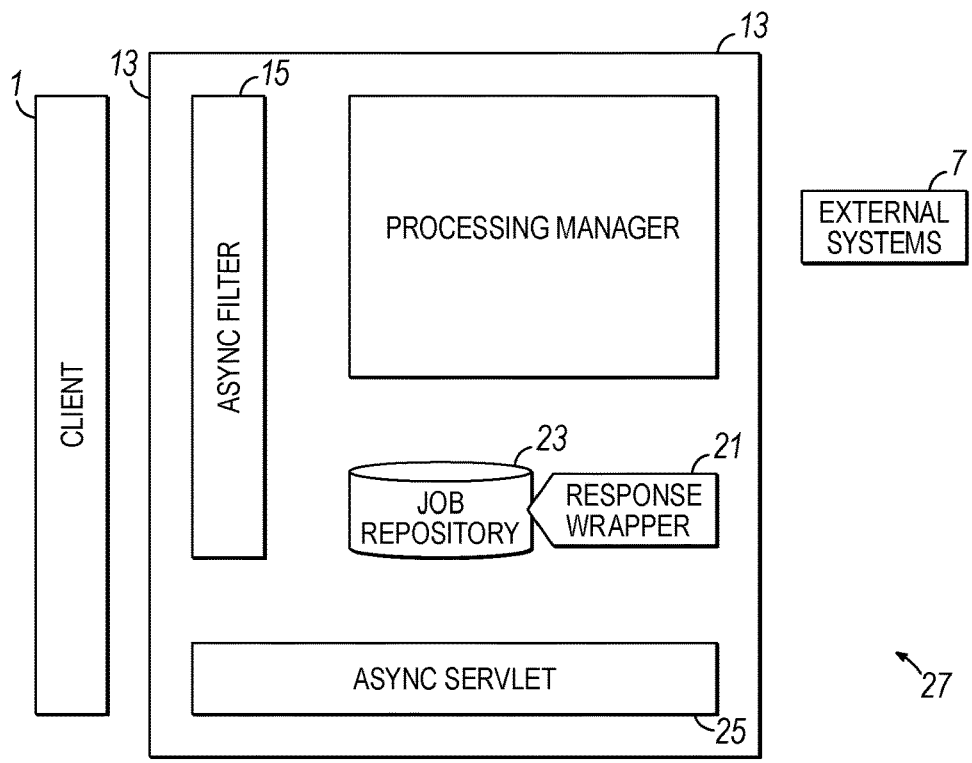
FIG. 6 is a schematic overview of a second exemplary type of a client-computer and server-computer system which is the basis of various embodiments illustrated in FIGS. 6 to 10.

FIG. 6: Overview, Second Type

FIG. 6 is a schematic overview of a second exemplary type of a client-computer and server-computer system. The description of FIG. 1 also applies to FIG. 6 in combination with the additions and variants described in this subsection dealing with FIG. 6.

In the second type of FIG. 6, the booking interceptor 3 of FIGS. 1-5 is subdivided into an asynchronous filter ("AsyncFilter") 15 and an asynchronous servlet ("AsyncServlet") 25. The functionalities of the notification manager 9 and the response cache 11 of FIGS. 1-5 are provided by the AsyncServlet 25 of FIG. 6, along with storage, referred to as job repository 23. The response wrapper mentioned as an optional functional element in the description of FIG. 2 is explicitly shown in FIG. 6 and labeled with reference numeral 21.

The AsyncFilter 15 is mainly responsible for intercepting booking request and, optionally booking-result request (in embodiments in which the final booking result is requested by a booking-result request), and forwarding and re-directing such requests. The AsyncServlet 25 is mainly responsible for providing booking-status information and the response-swapping function.

The entire client-server computer system is marked by reference numeral 27 in FIG. 6.

Figure 7:
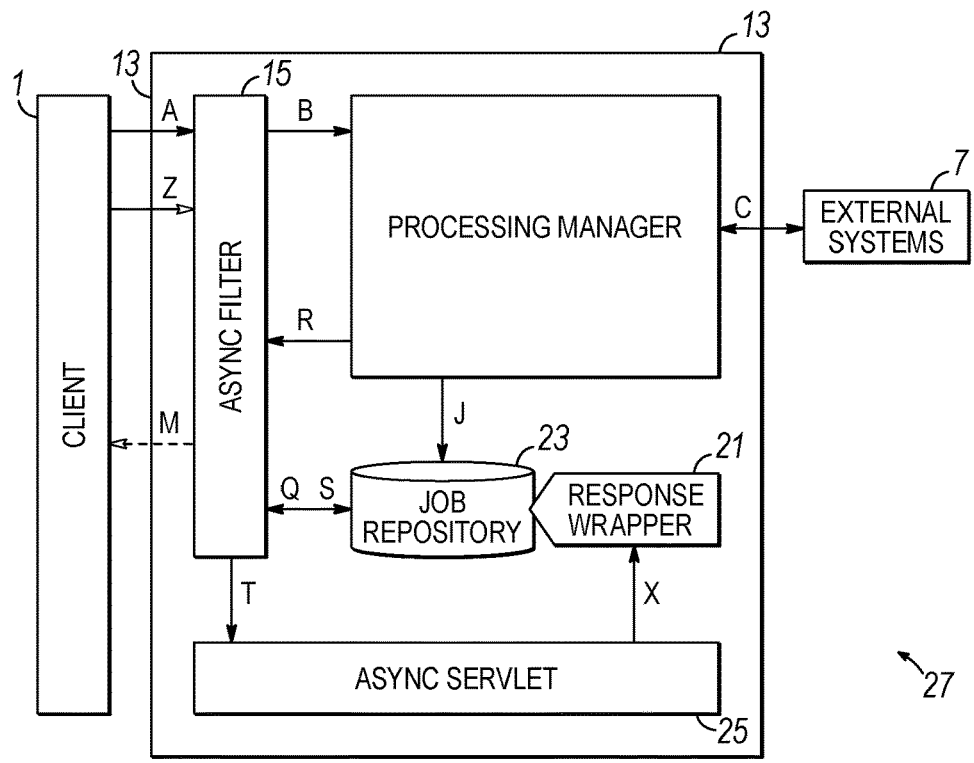
FIGS. 7 to 10 illustrate embodiments similar to those of FIGS. 2 to 5; however, in client-server computer systems of the second type shown in FIG. 6.

FIG. 7: Repeated Booking Request, Second Type

FIG. 7 illustrates an embodiments similar to that of FIG. 2; however, in a client-server computer systems of the second type shown in FIG. 6. The description of FIGS. 2 and 6 also applies to FIG. 7 in combination with the additions and variants described in this subsection dealing with FIG. 7.

In the embodiment of FIG. 7, there is a first booking request, as in FIG. 2. The first booking request is received at the server 13 (labeled as "A") and intercepted, as in FIG. 2, but the interception is performed by the AsyncFilter 15. As in FIG. 2, if the AsyncFilter recognizes that the booking request it is a first booking request (rather than a repeated booking request in the same transaction) it forwards the request to the booking manger 5, labeled as "B". As in FIG. 2, the processing manager 5 initiates the processing of the first booking request, whereby it may co-operate with the external systems 7, labeled as "C".

If the booking request is the first booking request in the booking transaction at issue, the AsyncFilter 15 also creates a new response wrapper 21 for this booking transaction in the job repository 23, labeled as "S". The response wrapper 21 is stored in the job repository 23. Assigned to the response wrapper 21 is a first response object which is associated with the first TCP connection established by the client 1 for transmitting the first booking request. The AsyncFilter 15 also notifies the AsyncServlet 25 about the new booking process started in the processing manager 5 and about the creation of the new response wrapper 21 in the job repository 23, labeled as "T".

During the booking process, the processing manger 5 stores booking-response data the job repository 23, as in FIG. 2, labeled as "J". The AsyncServlet 25 logically assigns the stored booking-response data to the first response object associated with the response wrapper 21.

In the embodiment of FIG. 7, there may also be a repeated booking request while the booking processing initiated by the first booking process is still ongoing, as in FIG. 2.

The repeated booking request is received at the server 13 (labeled as "Z") and intercepted, as in FIG. 2, but the interception is performed by the AsyncFilter 15. The AsyncFilter 15 checks in the job repository 23 whether a response wrapper associated with the current transaction session already exists, e.g., on the basis of a comparison of the session identifier of the first request (which was stored with the response wrapper) with that of the repeated request. If the AsyncFilter 15 considers the second request to be a repetition of the first booking request, the AsyncFilter 15 does not forward the booking request to the processing manager 5 to prevent another booking process from being initiated, as in FIG. 2.

In the embodiment of FIG. 7, the AsyncServlet 25 is responsible for updating the response wrapper 21. To this end, the AsyncFilter 15 notifies the AsyncServlet 25 of the receipt of the repeated booking request, labeled as "T". Thereupon, the AsyncServlet 25 swaps the booking result for this transaction already stored and still to be stored in the job repository 23 from the first response object to a new response object, which is associated with the new TCP connection established by the client 1 for transmitting the repeated booking request. The AsyncServlet 25 thereby updates the assignment of a response object to the response wrapper 21, labeled as "X", so that the content of the response wrapper 21 correctly refers to the actual HTTP request to which the final booking response has to be returned.

The processing manager 5 notifies the AsyncFilter 15 once the booking process is finished, labeled as "R". The AsyncFilter 15 then reads the final result of the booking process from job repository 23, labeled as "Q", and sends a HTTP response with the final booking result to the client 1, labeled as "M", on the basis of the updated response wrapper 21. The use of the updated response wrapper ensures that the booking response, which is the result of the first booking request, is correctly transmitted as a response to the repeated booking result. The final booking result is then displayed by the client's Web browser.

Figure 8:
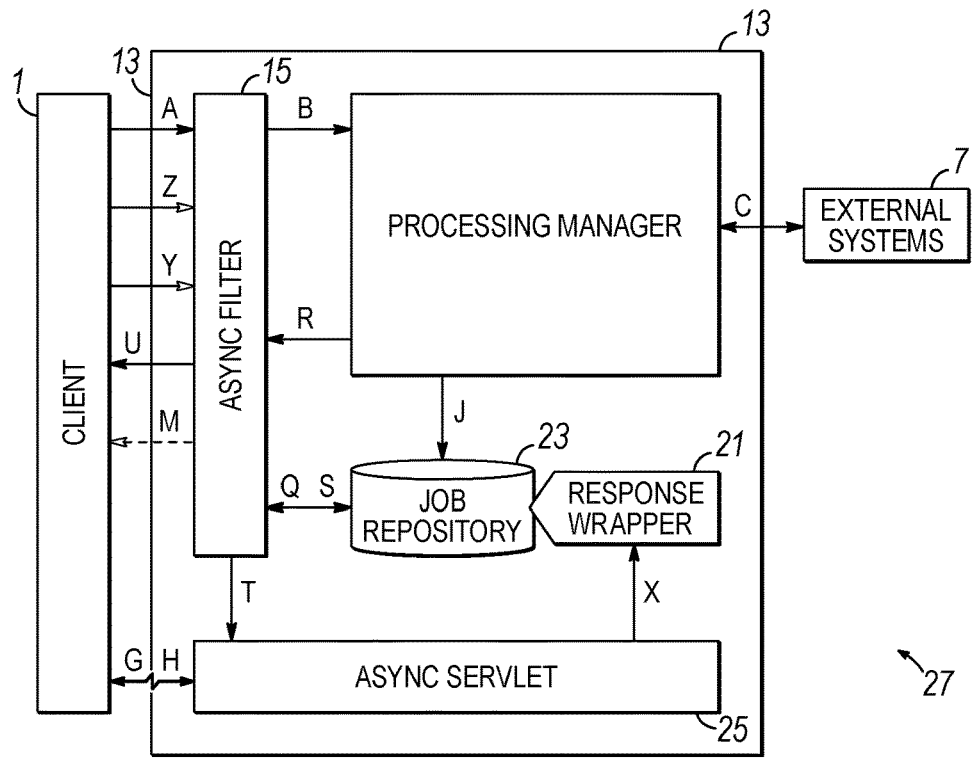

FIG. 8: Booking-Process Status Information, Second Type

FIG. 8 illustrates an embodiment similar to that of FIG. 3 in a client-server computer system of the second type shown in FIG. 7. The description of FIGS. 3 and 7 also applies to FIG. 8 in combination with the additions and variants described in this subsection dealing with FIG. 8.

In response to the first booking request, the AsyncFilter 15 sends, as an HTTP response, an HTML document with embedded or referenced mobile program code to the client 1, which is labeled as "U" in FIG. 8. The client 1 executes the mobile program code within its Web browser.

Upon executing the mobile program code, the client sends repeated HTTP requests for booking status information, as in FIG. 3, and labeled as "H". The client sends these booking-status requests to the AsyncServlet 25, which means that the client directs its requests from the AsyncFilter 15, to which the first booking request was sent, to the AsyncServlet 25.

Booking response data may be continuously prepared by processing manager 5, as a result of the ongoing booking process initiated by the first booking request, and incrementally stored in the job repository 23, labeled as "J". The AsyncServlet 25 reads the booking-response data from the job repository 23, creates booking status information indicative of a status of the processing of the first booking request from it, and, in response to the requests H, sends the booking status information, which may be in the form of booking status updates, to the mobile program code executed at the client 1, labeled as "G", as in FIG. 3. Thus, the booking status information appears to be pushed by the server 13, but is actually technically pulled by the client 1. In other embodiments, a real server push is used, as described in the context of FIG. 3. The mobile program code causes the booking status information to be displayed at the client 1, as in FIG. 3.

As described in connection with FIGS. 2 and 7, there may also be a repeated booking request (labeled as "Z") while the booking processing initiated by the first booking process is still ongoing. Once the repeated booking request has been sent from the client 1, the execution of the mobile code is terminated.

The AsyncFilter 15 recognizes that the second request is a repetition of the first booking request, and does not forward the booking request to the processing manager 5 to prevent another booking process from being initiated. In response to the receipt of the repeated booking request, while the booking process initiated by the first booking request is still ongoing, the AsyncFilter 15 re-submits the HTML document with the same embedded or referenced mobile program code to the client 1, again labeled as "U" in FIG. 8.

As in FIG. 3, upon receipt, execution of the (same) mobile-program code is again started in the client's Web browser. The newly started mobile program code re-accesses and displays the current booking status information, so that the apparent transition between what is displayed to the user before and after a repetition of the booking request will nearly be seamless.

Hence, while the previous booking-status communication took place between the client 1 a the AsyncServlet 25, as indicated by "G" and "H", the repeated booking request is again be directed to the AsyncFilter 15, as indicated by "Z". Then, in response to the receipt of the repeated booking request at the AsyncFilter 15, the repeated booking request is redirected to the AsyncServlet 25, where the communication regarding the booking status is resumed between the client 1 and the AsyncServlet 25, as indicated by "G" and "H".

During the processing of the booking initiated by the first booking request, the processing manger 5 stores the prepared response data or a portion of the prepared response data in job repository 23, labeled as "J", as in FIG. 7. Once the booking process has concluded, the processing manager 5 informs the AsyncFilter 15 about the completion of the booking process status, which may, in turn, inform the AsyncServlet 25, labeled as "R" and "T".

Thereupon, the AsyncServlet 25 sends an output-ready message to the mobile program code executed by client 1. The receipt of the output-ready message causes the mobile program code executing at the client 1 to issue another HTTP request in a new TCP connection, labeled as "Y", in order to obtain the final booking result, as in FIG. 3.

As described in the context of FIG. 3, the other HTTP request may be (i) a repetition of the first booking request, i.e., a mobile-code-issued repeated booking request, or (ii) a booking-result request different from the first booking request.

The other HTTP request is again directed to the AsyncFilter 15. The AsyncFilter 15 intercepts the other HTTP request and recognizes (i) that it is a repetition of the first booking request (but now received after the booking process has been completed), or (ii) that it is a booking-result request referring to the first booking request, e.g., based on a comparison of session identifiers.

In order that the final booking result is provided to the client 1, the AsyncFilter 15 notifies the AsyncServlet 25 of the receipt of the other HTTP request, labeled as "T". Thereupon, the AsyncServlet 25 swaps the final booking result stored in the job repository 23 from the first response object to a new response object which is associated with the new TCP connection established by the client 1 for transmitting the other HTTP request, as described in the context of FIG. 7. The AsyncServlet 25 thereby updates the assignment of a response object to the response wrapper 21, labeled as "X", so that the content of the response wrapper 21 correctly refers the other HTTP request to which the final booking response has to be returned.

The AsyncFilter 15 then reads the final result of the booking process from the job repository 23, labeled as "Q", and sends an HTTP response with the final booking result to the client 1, labeled as "M", on the basis of the updated response wrapper 21. The use of the updated response wrapper ensures that the booking response, which is the result of the first booking request, is correctly transmitted as a response to the other HTTP request. The final booking result is then displayed by the client's Web browser.

Figure 9:
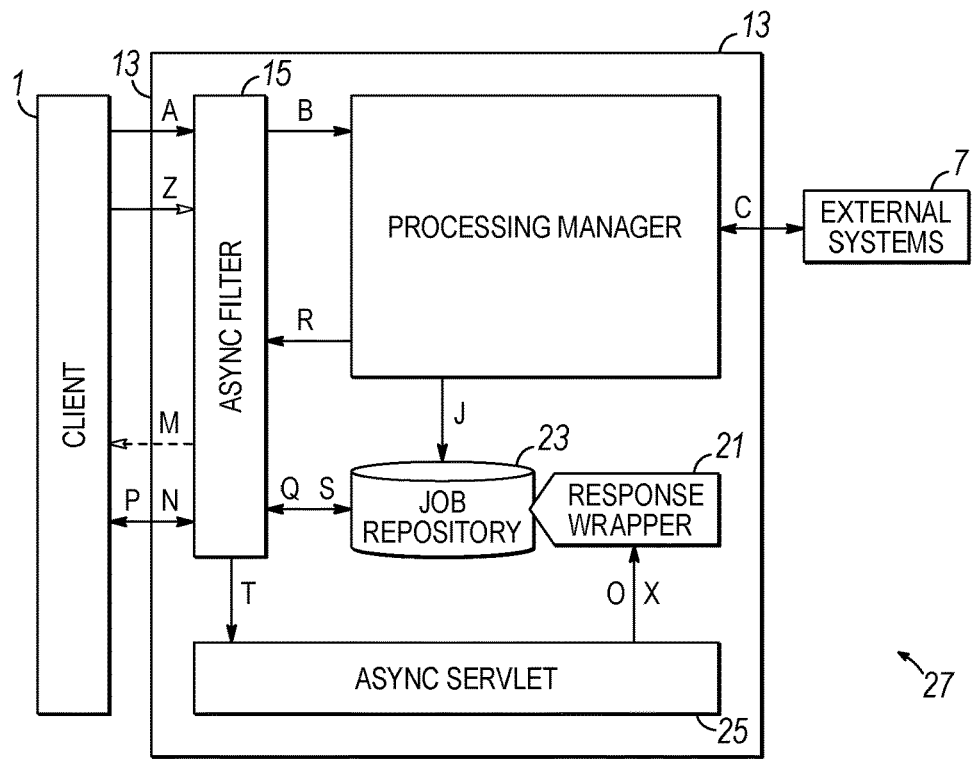
Figure 10:
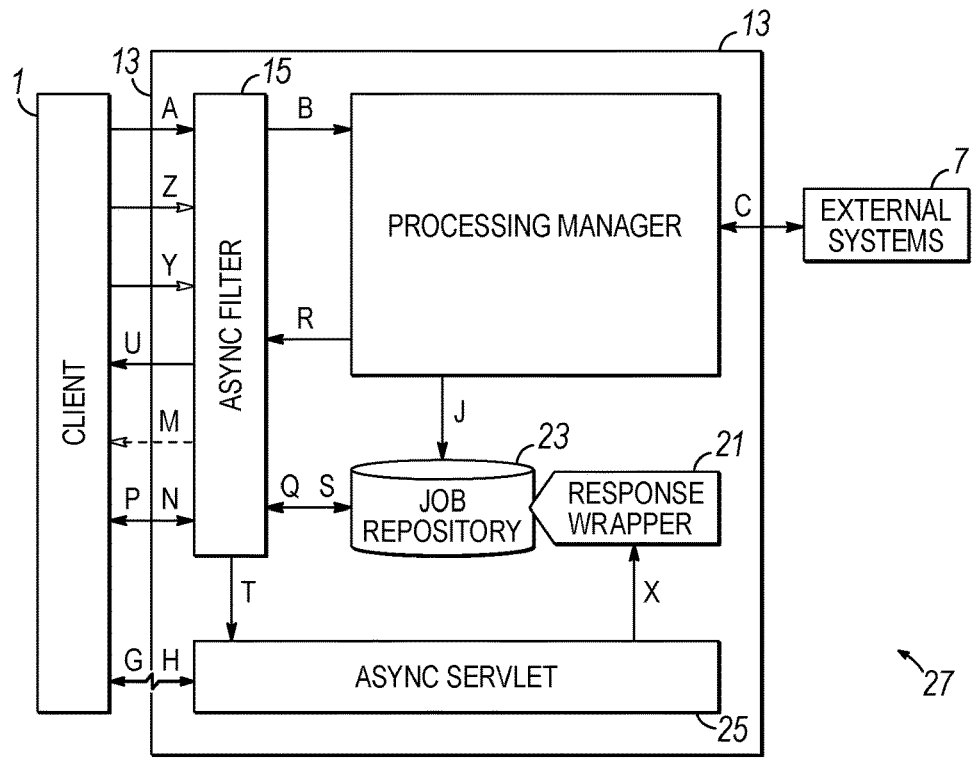

FIGS. 9 and 10: Confirmation, Second Type

FIGS. 9 and 10 illustrate embodiments similar to those of FIGS. 4 and 5 in a client-server computer system of the second type shown in FIGS. 7 and 8, respectively. The description of FIGS. 4, 5 and FIGS. 7, 8 also applies to FIGS. 9, 10 in combination with the additions and variants described in this subsection dealing with FIGS. 9, 10.

As in FIGS. 4 and 5, upon receipt of the final booking result labeled as "M" the client 1 returns a confirmation to the server's AsyncFilter 15 that the final booking result has been received and displayed at the client, labeled as "N". The confirmation may be in the form of an HTTP request The booking-response data is not immediately discarded from the job repository 23 after having been sent to the client 1. The storage of the booking-response data in the job repository 23 is rather extended to a point of time when the confirmation N is received from the client 1 that the final booking result has been received and displayed at the client 1. In response to the receipt of the confirmation from client 1, the AsyncFilter 15 causes the booking-response data prepared in response to the first booking request to be discarded from the job repository 23. Optionally, the AsyncFilter 15 may send a response to the confirmation to complete the HTTP request-response protocol, labeled as "P".

Figure 11:
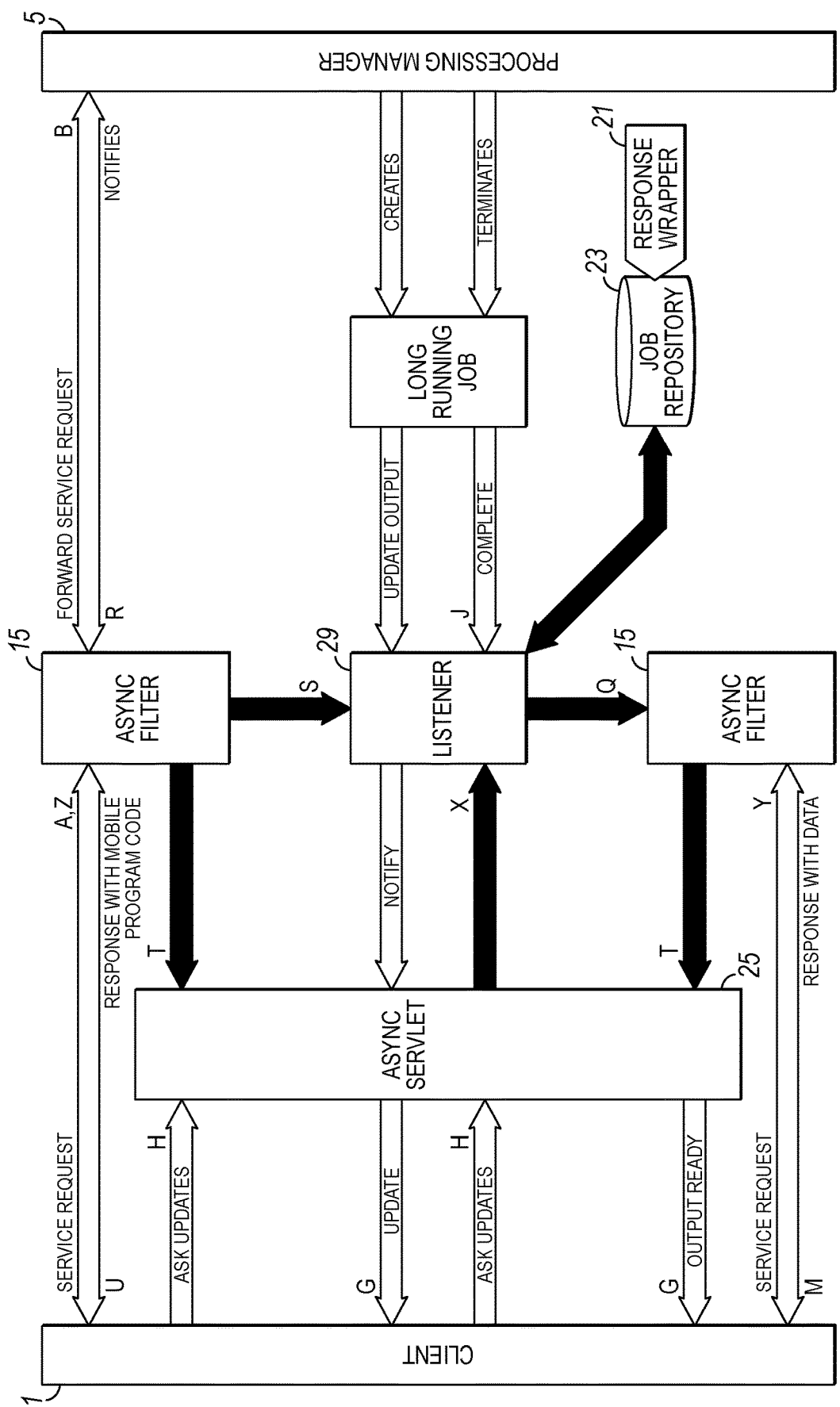
FIG. 11 shows another embodiment similar to the embodiments of FIGS. 3 and 8, however, in a client-server computer system of a third type.

FIG. 11: Embodiment of a Third Type

FIG. 11 shows another embodiment similar to the embodiments of FIGS. 3 and 8 in a client-server computer system of a third type. The description of FIGS. 3 and 8 also applies to FIG. 11 in combination with the additions and variants described in this subsection dealing with FIG. 11.

In comparison with FIG. 8, the embodiment of FIG. 11 has an additional functional module, referred to as "listener 29", which mediates between the AsyncFilter 15, the AsyncServlet 25, and the processing manager 5, and manages read and write accesses to the job repository 23.

Another difference between the FIGS. 8 and 11 is apparent. In FIG. 11, the AsyncFilter 15 is shown twice. Actually, the two boxes labeled as "AsyncFilter 15" represent only one AsyncFilter which is only drawn twice to depict its various functional relations to the other elements more clearly. Various requests H for booking-status updates by the mobile-program code, as in FIG. 8 and one update response G as well as an output-ready response G are also explicitly shown in FIG. 11

Upon receipt of a booking request (first or repeated booking request), the AsyncFilter 15 checks via the listener 29 whether a response wrapper 21 already exists in the job repository 23 for this request, e.g., by comparing session identifiers, and creates a new response wrapper 23, if applicable. These activities are labeled as "S" and "Q" in FIG. 11.

Re-assigning, or swapping, an existing response wrapper 21 assigned to the first booking request to the last received booking request, or to a booking-result request, by the AsyncServlet 25 is also performed via the listener 29, labeled as "X".

The processing manager 5 creates the booking process with the aid of external systems (FIGS. 3 and 8), i.e., the long-running job, and terminates the long-running job when the final booking result is determined. The processing manager 5 provides booking-status information, including booking-status updates and a booking-completion notification to the AsyncServlet 25 via the listener 29. The listener 29 also notifies the AsyncServlet 25 about updating, or swapping, of the response wrapper 21. The processing manager 5 also stores booking-result data, including partial booking results and the final booking result, in the job repository 23 via the listener 29. The listener notifies the AsyncServlet 25 about events and status changes, and also provides the AsyncFilter 15 with partial and/or final booking-result data from the job repository 23 and, if needed, and with the associated response wrapper 23.

Figure 12:
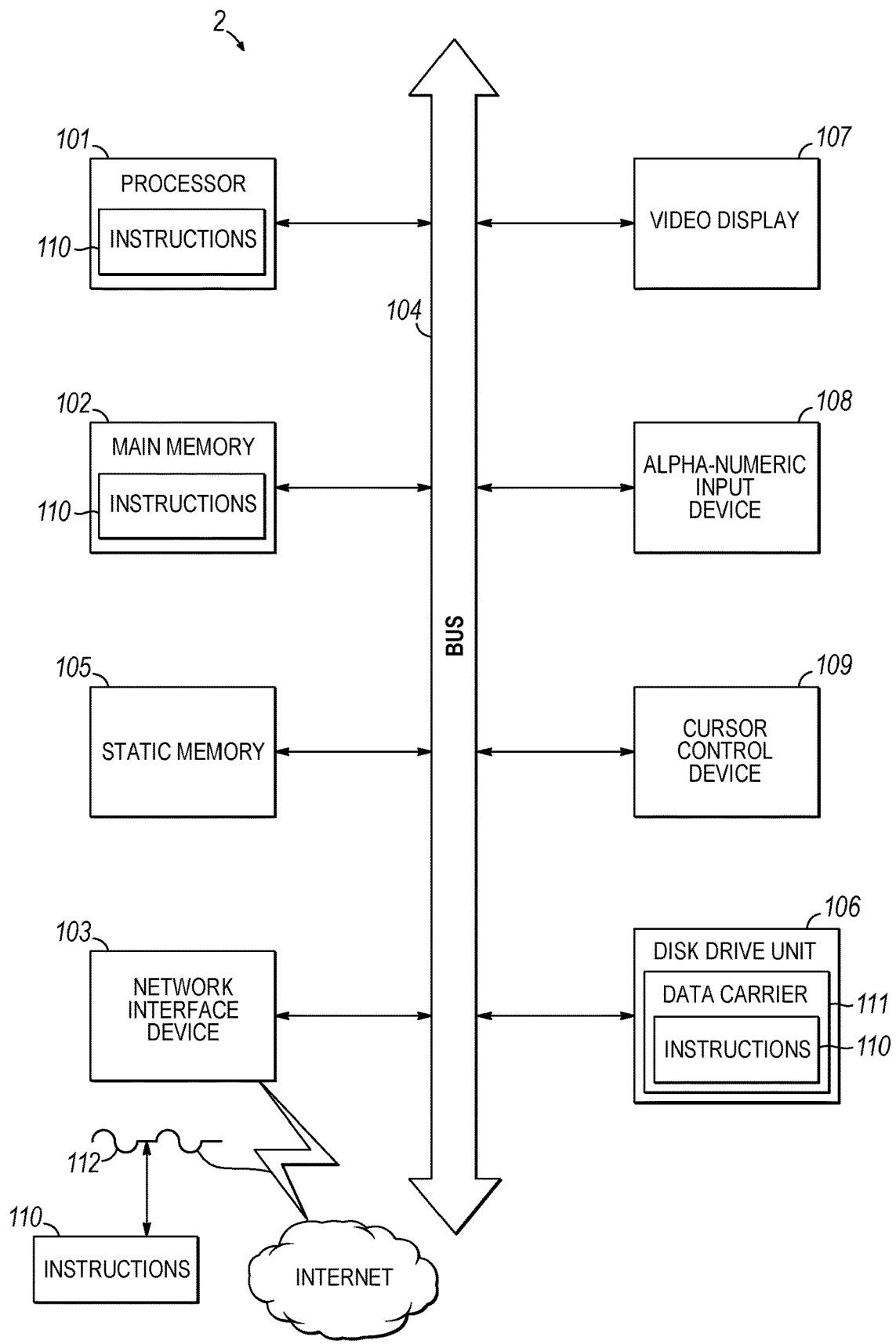
FIG. 12 shows an exemplary computer system arranged to carry out the methodologies described herein.

FIG. 12, Client- and Server-Computer System

FIG. 12 is a diagrammatic representation of an exemplary server computer system 13. FIG. 12 is also a diagrammatic representation of the client computer 1. The computer system 1, 13 includes at least one processor 101, a main memory 102, and a network interface 103. The computer system 1, 13 further includes a magnetic or optical disk drive unit 106 with a data carrier 111 and, optionally, a static memory 105, e.g., a non-removable flash, a solid state drive and/or a removable data carrier, which may permanently store the software enabling the computer system 1, 13 to execute its functions. The main memory 102 may represent the random access memory (RAM) comprising the main storage of the computer system 1, 13, as well as any supplemental levels of memory, e.g., cache memories, non-volatile or backup memories 105 that are static, read-only memories, etc. In addition, the main memory 102 may be considered to include memory storage physically located elsewhere in the computer system 1, 13, e.g., any cache memory in a microprocessor, as well as any storage capacity used as a virtual memory, e.g., as stored on a mass storage device or on another computer coupled to the computer system 1, 13.

Furthermore, the computer 1, 13 may include a display 107, an alpha-numeric input device 108, and/or a cursor control device 109. A database, such as the job repository 23, may be stored in the static memory 105; or an external database with the job repository 23 may be accessible via the network interface device 104. Access to the external systems 7 may also be provided via the network interface device 103.

Both the client computer 1 and the server computer system 13 communicate with each other via the Internet via the network interface device 13. Data is physically transmitted over the Internet as propagated signals 112.

Regarding the server-computer system 13, an executable set of instructions 110 representing the server-computer program 110 embodying the functional modules of the server-computer system 13 described in connections with FIGS. 1 to 12 and the methodologies of the server-computer system 13 described above, resides in the non-volatile memory 111 and, optionally 105 of the server-computer system 13. When executed, a corresponding set of instructions 110 may also reside in the main memory 102 and/or the processor 101 of the server-computer system 13. The instructions 110 included in the mobile program code to be sent to the client via the network interface 103 and the Internet are stored in the non-volatile memory 111 or 105 and, optionally, in the main memory 102 of the server-computer system 13.

Regarding the client computer 1, an executable set of instructions 110 representing the server-computer program 110 embodying the client's Web browser resides in the non-volatile memory 111 and, optionally 105 of the client computer 1. The instructions 110 included in the mobile program code received via the Internet at the network interface 103 are stored in the main memory 102 and, optionally, in the disk drive unit 106/111 of the client computer 1. When executed, the combined instructions 110 of the Web browser and the mobile program code may reside in the main memory 102 and/or the processor 101 of the client computer 1.

The program code embodied in any of the applications/modules described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

These computer program instructions may also be stored in a computer readable medium that can direct a computer, other types of programmable data processing apparatus, or other devices to function in a particular manner, such that the instructions stored in the computer readable medium produce an article of manufacture including instructions that implement the function/act specified in the block or blocks of the flowchart and/or block diagram.

The computer program instructions may also be loaded onto a computer, other programmable data processing apparatus, or another device to cause a series of computations to be performed on the computer, the other processing apparatus, or the other device to produce a computer implemented process such that the executed instructions provide one or more processes for implementing the functions/acts specified in the flowchart and/or block diagram block or blocks.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail.

Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method for preventing double booking in response to a repeated hypertext transfer protocol (HTTP) request received from a client, the method comprising:
    providing a web page to the client, wherein the web page includes a reference to a uniform resource indicator (URI) and a session identifier is embedded in the URI;
    after providing the web page to the client, receiving a first hypertext transfer protocol (HTTP) request from the client at a server, wherein the first HTTP request includes the session identifier;
    providing, by the server in response to the first HTTP request, mobile program code to the client, wherein the mobile program code causes the client to display booking status information indicative of a processing status of the first booking request and the mobile program code repeatedly updates the displayed booking status based on repeated communication of the processing status from the server to the client;
    initiating, by the server, preparation of response data for the client to process the first HTTP request;
    creating a response wrapper, by the server, wherein a first response object is assigned to the response wrapper and the first response object represents a first transport-protocol connection established by the client for transmitting the first HTTP request;
    assigning, by the server, the prepared response data to the first response object;
    storing, by the server, the response data and the response wrapper in a job repository at the server, wherein response data is continuously prepared as a result of the ongoing process initiated by the first HTTP request and incrementally stored in the job repository;
    receiving a second hypertext transfer protocol (HTTP) request from the client at the server, wherein the second HTTP request includes the session identifier;
    determining the second HTTP request is a repetition of the first HTTP request based on the session identifier;
    preventing, by the server, the second HTTP request from being processed;
    checking, by the server, whether the response wrapper already exists in the job repository for the received second HTTP request by comparing session identifiers,
    updating, by the server in response to existence of the response wrapper in the job repository, the response wrapper with a second response object representing a second transport-protocol connection established by the client for transmitting the second HTTP request;
    performing, by the server, response swapping by assigning the response data prepared in response to the first HTTP request from the first response object to the second response object; and
    returning, by the server in response to the repeated request, a response to a web browser of the client comprising the response data prepared in response to the first HTTP request.

2. The method of claim 1 wherein the second HTTP request is caused by user activity, the mobile program, or a combination thereof.

3. The method of claim 1 comprising:
    in response to completion of the processing of the first HTTP request, sending an output-ready message to the client,
    wherein the program code is configured, when being executed at the client, to generate the second HTTP request in response to the output-ready message and to the second HTTP request to the server.

4. A system for preventing double booking in response to a repeated hypertext transfer protocol (HTTP) request received from a client, the system comprising:
    a server;
    at least one processor; and
    a memory coupled to the at least one processor, the memory including program code configured to be executed by the at least one processor to cause the server to:
        provide a web page to the client, wherein the web page includes a reference to a uniform resource indicator (URI) and a session identifier is embedded in the URI;
        receive a first hypertext transfer protocol (HTTP) request from the client after providing the web page to the client;
        provide, in response to the first HTTP request, mobile program code to the client, wherein the mobile program code causes the client to display booking status information indicative of a processing status of the first booking request and the mobile program code repeatedly updates the displayed booking status based on repeated communication of the processing status from the server to the client;
        initiate preparation of response data for the client to process the first HTTP request;
        create a response wrapper, wherein a first response object is assigned to the response wrapper and the first response object represents a first transport-protocol connection established by the client for transmitting the first HTTP request;
        assign the prepared response data to the first response object;
        store the response data and the response wrapper in a job repository, wherein response data is continuously prepared as a result of the ongoing process initiated by the first HTTP request and incrementally stored in the job repository;
        receive a second hypertext transfer protocol (HTTP) request from the client, wherein the second HTTP request includes the session identifier;
        determine the second HTTP request is a repetition of the first HTTP request based on the session identifier;
        prevent the second HTTP request from being processed;
        check whether the response wrapper already exists in the job repository for the received second HTTP request by comparing session identifiers,
        update, in response to existence of the response wrapper in the job repository, the response wrapper with a second response object representing a second transport-protocol connection established by the client for transmitting the second HTTP request;
        perform response swapping by assigning the response data prepared in response to the first HTTP request from the first response object to the second response object; and return, in response to the repeated request, a response to a web browser of the client comprising the response data prepared in response to the first HTTP request.

5. The system of claim 4 wherein the second HTTP request is caused by user activity, the mobile program, or a combination thereof.

6. The system of claim 4 wherein the program code is further configured to be executed by the at least one processor to cause the server to:
send an output-ready message to the client in response to completion of the processing of the first HTTP request,
wherein the program code is configured, when being executed at the client, to generate the second HTTP request in response to the output-ready message and to send the second booking request to the system.

7. A computer program product comprising:
a non-transitory computer readable storage medium; and
program code stored on the computer readable storage medium and configured, upon execution, to cause at least one processor to:
provide a web page to the client, wherein the web page includes a reference to a uniform resource indicator (URI) and a session identifier is embedded in the URI;
receive a first hypertext transfer protocol (HTTP) request from the client;
provide, in response to the first HTTP request, mobile program code to the client, wherein the mobile program code causes the client to display booking status information indicative of a processing status of the first booking request and the mobile program code repeatedly updates the displayed booking status based on repeated communication of the processing status from the server to the client;
initiate preparation of response data for the client to process the first HTTP request;
create a response wrapper, wherein a first response object is assigned to the response wrapper and the first response object represents a first transport-protocol connection established by the client for transmitting the first HTTP request;
assign the prepared response data to the first response object;
store the response data and the response wrapper in a job repository, wherein response data is continuously prepared as a result of the ongoing process initiated by the first HTTP request and incrementally stored in the job repository;
receive a second hypertext transfer protocol (HTTP) request from the client, wherein the second HTTP request includes the session identifier;
determine the second HTTP request is a repetition of the first HTTP request based on the session identifier;
prevent the second booking request from being processed;
check whether the response wrapper already exists in the job repository for the received second HTTP request by comparing session identifiers,
update, in response to existence of the response wrapper in the job repository, the response wrapper with a second response object representing a second transport-protocol connection established by the client for transmitting the second HTTP request;
perform response swapping by assigning the response data prepared in response to the first HTTP request from the first response object to the second response object; and
return, in response to the repeated request, a response to a web browser of the client comprising the response data prepared in response to the first HTTP request.

* * * * *